March 21, 1944. T. C. VAN DEGRIFT 2,344,753
BALANCING MACHINE
Filed Aug. 2, 1940 2 Sheets-Sheet 1
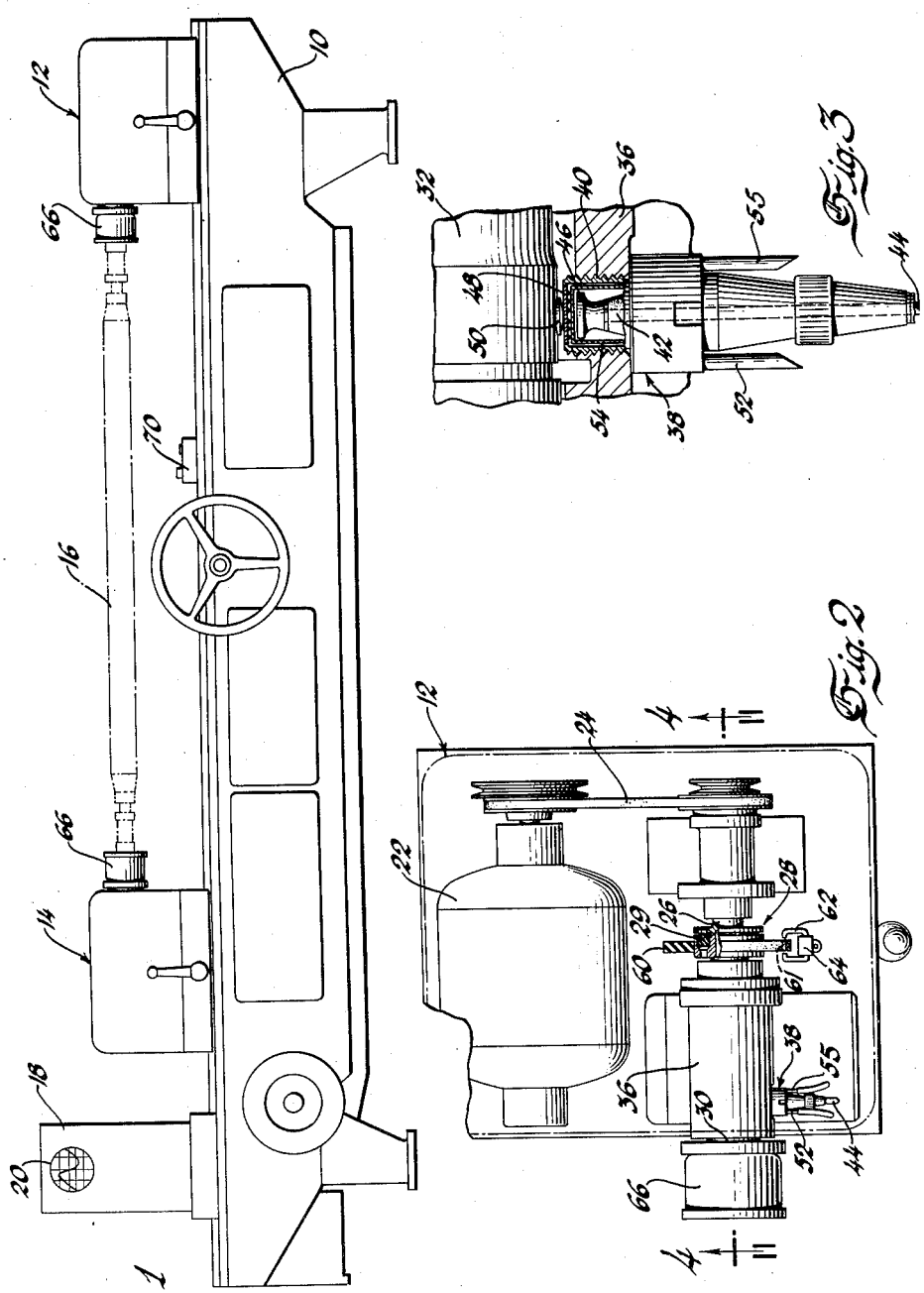
Inventor
Thomas C. Van Degrift
By Blackmore, Spencer & Hirt
Attorneys March 21, 1944. T. C. VAN DEGRIFT 2,344,753
BALANCING MACHINE
Filed Aug. 2, 1940 2 Sheets-Sheet 2
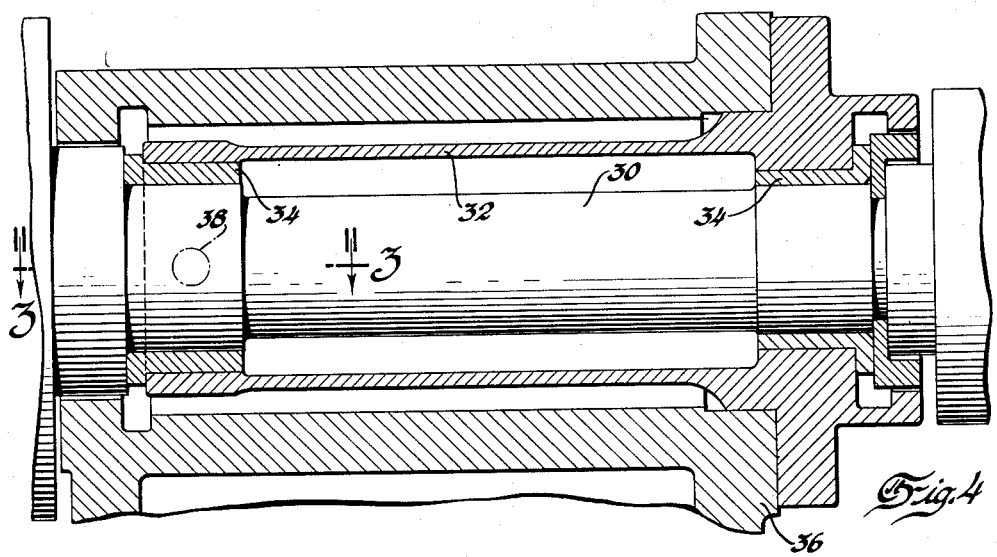
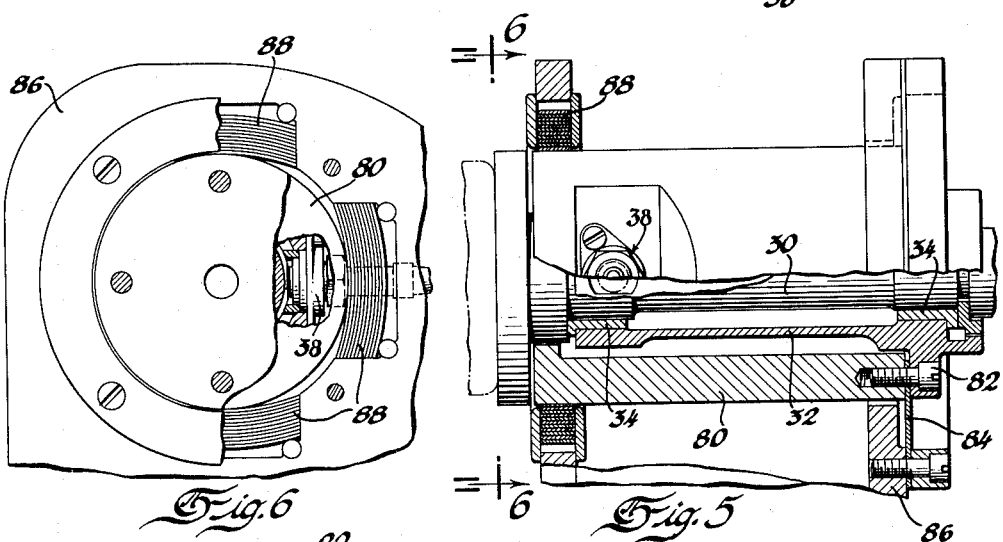
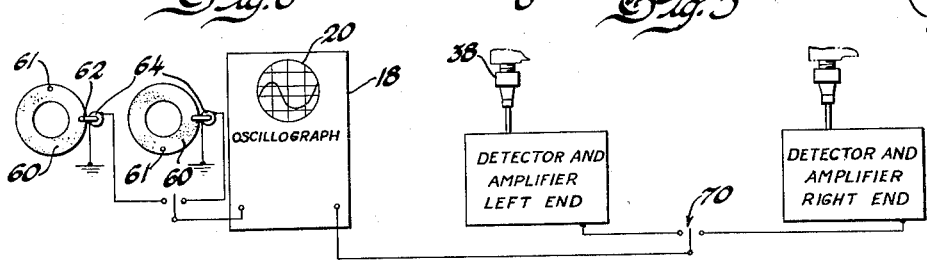
Inventor
Thomas C. Van Degrift Patented Mar. 21, 1944

2,344,753

UNITED STATES PATENT OFFICE 2,344,753

BALANCING MACHINE

Thomas C. Van Degrift, Detroit, Mich., assignor to General Motors Corporation, Detroit, Mich., a corporation of Delaware Application August 2, 1940, Serial No. 349,413

9 Claims. (Cl. 73—53)

This invention has to do with improvements in balancing machines especially those of the type disclosed in the copending application of Van Degrift, Hope and Huber filed September 29, 1939 under Serial No. 297,082, which has matured into Patent No. 2,329,835.

In that application there is disclosed a balancing machine for propeller shafts in which the propeller shaft or other part to be balanced is supported and driven by spaced stub shafts, each of which is mounted in a journal box or journal bearing supported at its opposite ends so as to permit but slight movement of the shaft and box in response to unbalance. The adjacent supports for the journal boxes are constructed to permit limited radial movement while the other supports permit limited axial movement. The adjacent supports include cantilevers on which the boxes rest, the cantilevers serving as movable plates of a condenser or condensers included in a suitable indicating circuit in which a cathode ray oscillograph is provided to give the desired indication.

I have found it possible to simplify and improve this construction as well as increase its accuracy by making the journal bearings in the form of cantilevers supported at the ends remote from the part to be balanced. The deflection of the cantilever bearings in response to unbalance is used to actuate a suitable indicating device preferably of the condenser type such as that disclosed and claimed in the Patent No. 2,266,315 issued to Frawley and Grinstead on December 16, 1941.

In the development of the cantilever bearing the difficulty was encountered that the natural period of vibration of the bearing at times came within the range of vibration resulting from unbalance so as to adversely affect the readings when balancing certain parts. I have found it possible to eliminate this difficulty by providing damping means for the cantilever bearings. The damping means may take various forms, such as mechanical, hydraulic, electrical or combinations if desired. I have preferred to employ mechanical damping, using a combination of inertia and friction, by mounting the bearing in an inertia member damped by suitable springs, the inertia member and bearing preferably having a common spring mounting so as to permit the two to vibrate together. At the same time the cantilever bearing can vibrate independently of the inertia member and such independent movement is transmitted to an indicating device such as described, which is carried by the inertia member. With this arrangement the natural frequency of the bearing and inertia member is out of the range of frequency of the vibration produced by unbalance and accurate indications of unbalance are obtainable under all conditions encountered in practice. At the same time the machine remains sensitive to very small amounts of unbalance.

Another improvement consists in driving the stub shafts, mounted as described, from separate driving shafts connected to them through suitable universal joints. The stub shafts are insulated by the joints from vibration from the driving means thereby increasing the accuracy of the indication of out of balance.

Various modifications will occur to those skilled in the art.

In the drawings:

Figure 1 is a front elevation of the machine.

Figure 2 is a top plan view of the mechanism for driving the part to be balanced located at the right hand of Figure 1, the cover being removed to better show the parts.

Figure 3 is a fragmentary section taken on line 3—3 of Figure 4.

Figure 4 is a fragmentary section taken on line 4—4 of Figure 2.

Figure 5 is a view corresponding to Figure 4 but showing a modification.

Figure 6 is a view taken on line 6—6 of Figure 5 with parts broken away.

Figure 7 illustrates diagrammatically the circuit employed.

The balancing machine comprises a base 10 on which are mounted cooperating driving heads 12 and 14 adapted to receive and drive the ends of a propeller shaft 16. The propeller shaft illustrated is of the common type equipped with universal joints at its ends. The machine is of course adapted to balance other parts as well. 18 indicates a cathode ray oscillograph; 20 being the screen on which, in operation, a sine wave is projected in case unbalance exists, the amplitude of the wave varying in accordance with the amount of unbalance while the location of the peak of the wave indicates the angular location of unbalance. The oscillograph is of well known type and is operated by means to be later described.

Each of the driving heads 12 and 14 comprises an electric motor 22 connected by belt 24 to driving shaft 26 connected by universal joint 28 to driven shaft 30. Driving shaft 26 is mounted in suitable bearings fixed to the base 10. Universal joint 28 may be of any suitable type but for best results embodies cushioning means which, as shown, may take the form of rubber blocks 29 suitably arranged between the driving and driven parts of the joint so as to prevent transmission of vibration from one shaft to the other. Without such insulation vibration may be transmitted from the driving shaft 26 to the driven shaft 30 in sufficient amount to affect the reading of unbalance, especially in machines of the type here disclosed in which the mounting for the part to be balanced is relatively rigid. The advantage of employing relatively rigid mounting in balancing machines is, of course, that the parts to be balanced may be rotated at high speed on the order of that encountered in service with the result that the effects of out-of-balance are magnified so small unbalances may be readily located.

Driven shaft 30 is mounted in cantilever bearing 32 which may be lined with soft bearing metal throughout or, if desired, may be provided with liners 34 at its ends only. In the form shown in Figure 4 the cantilever bearing 32 is supported at one end by bracket 36 secured to base 10.

38 indicates an indicating device shown in detail in Figure 3, adapted to engage the free end of the cantilever bearing 32 to indicate movements produced by vibration of the bearing as the result of rotating a part which is unbalanced. The indicating device 38 may be of any suitable type. I have indicated a condenser type of indicator described and claimed in the Frawley and Grinstead patent previously referred to. The device consists of a shell 40 threaded into housing 36 or otherwise secured thereto. Within the shell is secured a suitable insulator 42 having a central conductor 44 connected to fixed condenser plate 46. 48 indicates a plate preferably integral with shell 40 or welded thereto. The outer end of the plate 48 preferably engages convex lug 50 secured to bearing 32. The plate 48 together with the portion of the shell 40 which it overlies and to which it is secured constitutes a condenser plate movable with respect to the fixed condenser plate 46. In some cases it may be desirable to provide for cooling of the indicator and this may be accomplished by supplying water or other cooling fluid through pipe 52 to passages 54 in the shell and between the shell and the plate 48, the cooling liquid being discharged through passage 55.

In Figure 2, 60 indicates a ring of insulating material secured to the exterior of universal joint 28 although it may be connected to the rotating parts wherever convenient. 61 indicates a permanent magnet mounted in the periphery of insulator 60 and adapted to pass between poles 62 of electromagnet 64 so as to give an impulse once every revolution to the circuit including the electromagnet 64.

In the operation of the device the propeller shaft 16 is inserted in the machine, as shown in Figure 1, being secured in any suitable manner to driving members 66 on shafts 30. Motors 22 are then started to rotate the shaft at the desired speed and switch 70, Figure 7, is then set to close the circuit from the oscillograph 18 to either the left or right indicating mechanism as desired. If the propeller shaft is out-of-balance shafts 30 and bearings 32 gyrate, thereby moving movable condenser plate including plate 48 and varying the capacity in the high frequency alternating current circuit, including the condenser and a detector and amplifier unit as indicated in Figure 7. The wave impressed on the circuit by the movement of the condenser passes through switch 70 to the oscillograph. The oscillograph is of the type disclosed in my prior application Serial No. 297,082, filed September 29, 1939, now Patent No. 2,329,835, having an internal sweep which is locked in synchronism with the rotation of the propeller shaft by the impulse given to inductance 64 by the passage of permanent magnet 61 between its poles once during each revolution of the shaft. The sine wave produced by movement of the movable condenser plate 48 will appear on the screen 20 of the oscillograph and owing to the fact that the internal sweep of the oscillograph is locked in synchronism with shaft rotation the sine wave on the screen, with proper calibration of the screen, will indicate both the amount and angular location of unbalance in known manner.

In the modification shown in Figures 5 and 6 the cantilever bearing 32 for shaft 30 is rigidly secured to inertia member or support 80 as by bolts 82 which may also be employed to secure members 80 and 32 to flexible steel diaphragm 84 bolted to a bracket 86 suitably secured to the base 10. Diaphragm 84 constitutes a yieldable spring mounting permitting slight endwise or tilting movement of the bearing assembly but resisting radial movement. Inertia member 80 is also in effect a cantilever and its free ends is engaged by leaf springs 88 which dampen its movement. Indicator 38 in this instance is mounted in inertia member 80 so that it records only the movement of cantilever bearing 32 relative to inertia member 80.

The arrangement shown in Figures 5 and 6 operates the same as that previously described. The use of inertia member 80 and damping springs 88 insures that the natural period of vibration of the assembly of cantilever bearing and inertia member is out of the range of vibration resulting from unbalance. At the same time the mounting of the indicating device 38 on the inertia member so as to be actuated directly by movements of cantilever bearing 32 resulting from unbalance insures a high degree of sensitivity since the movements of the free end of the cantilever bearing are not directly damped.

Various modifications will occur to those skilled in the art.

I claim:

1. In a balancing machine, a base, a shaft for driving the part to be balanced, means for supporting the shaft on the base comprising a cantilever bearing, an inertia member rigidly secured to the bearing, means for mounting the bearing and inertia member on the base so as to permit slight yielding movement in response to unbalance, means for damping the movement of the inertia member, and indicating means carried by said inertia member and arranged to be actuated by relative movement of the free end of said bearing in response to unbalance.

2. In a balancing machine, a base, a shaft for driving the part to be balanced, means for supporting the shaft on the base comprising a cantilever bearing, a cylindrical inertia member surrounding the bearing and rigidly secured thereto adjacent its fulcrum end, means for mounting the bearing and inertia member on the base so as to permit slight yielding movement in response to unbalance, and indicating means carried by said inertia member and arranged to be actuated by relative movement of the free end of said bearing in response to unbalance.

3. In a balancing machine, a base, a shaft for driving the part to be balanced, means for supporting the shaft on the base comprising a cantilever bearing, a cylindrical inertia member surrounding the bearing and rigidly secured thereto adjacent its fulcrum end, means for mounting the bearing and inertia member on the base so as to permit slight yielding movement in response to unbalance, means for damping the movement of the inertia member, and indicating means carried by said inertia member and arranged to be actuated by relative movement of the free end of said bearing in response to unbalance.

4. In a balancing machine, a support for the part to be balanced comprising a cylindrical bearing, means for rigidly supporting the bearing at one end only leaving the other end free to vibrate in response to unbalance, and indicating means including an actuator mounted on said supporting means and engaging the free end of said bearing to measure the vibration thereof in response to unbalance.

5. In a balancing machine, a shaft for driving the part to be balanced, a cylindrical bearing for the shaft, means for rigidly supporting the bearing at one end only, leaving the other end free to vibrate in response to unbalance, and indicating means including an actuator mounted on said supporting means and arranged to be actuated by movement of the free end of said bearing in response to unbalance.

6. In a balancing machine a support for the part to be balanced comprising a pair of aligned cylindrical bearings, means for rigidly supporting the bearings at the ends remote from each other, the adjacent ends of said bearings being free to vibrate in response to unbalance, and indicating means associated with each of said bearings including an actuator mounted on said supporting means and engaging the free end of said cylindrical bearing to measure the vibration thereof in response to unbalance.

7. In a balancing machine a pair of spaced shafts for driving the part to be balanced, a cylindrical bearing for each of the shafts, said bearings being arranged in aligned relation, means for rigidly supporting the bearings at the ends thereof more remote from each other, the adjacent ends of said bearings being free to vibrate in response to unbalance, and indicating means including an actuator mounted on each of said supporting means and engaging the free end of the corresponding bearing so as to be actuated by movement thereof.

8. In a balancing machine, a base, and means for supporting the part to be balanced comprising a bearing, an inertia member rigidly secured to the bearing at one end thereof and extending along the length of the bearing but spaced therefrom, means for mounting the bearing and inertia member on the base so as to permit slight yielding movement in response to unbalance, and indicating means including an actuator carried by the free end of said inertia member and engaging said bearing and arranged to be actuated by relative movement of the free end of said bearing in response to unbalance.

9. In a balancing machine, a base, a shaft for driving the part to be balanced, means for supporting the shaft on the base comprising a bearing, an inertia member rigidly secured to the bearing at one end thereof and extending along the length of the bearing but spaced therefrom, means for mounting the bearing and inertia member on the base so as to permit slight yielding movement in response to unbalance, and indicating means including an actuator carried by the free end of said inertia member and engaging said bearing and arranged to be actuated by relative movement of the free end of said bearing in response to unbalance.

THOMAS C. VAN DEGRIFT.